Oct. 14, 1952  L. R. MUSKAT  2,613,905
AUTOMATIC WEIGHING MACHINE
Filed Dec. 19, 1945  7 Sheets-Sheet 1
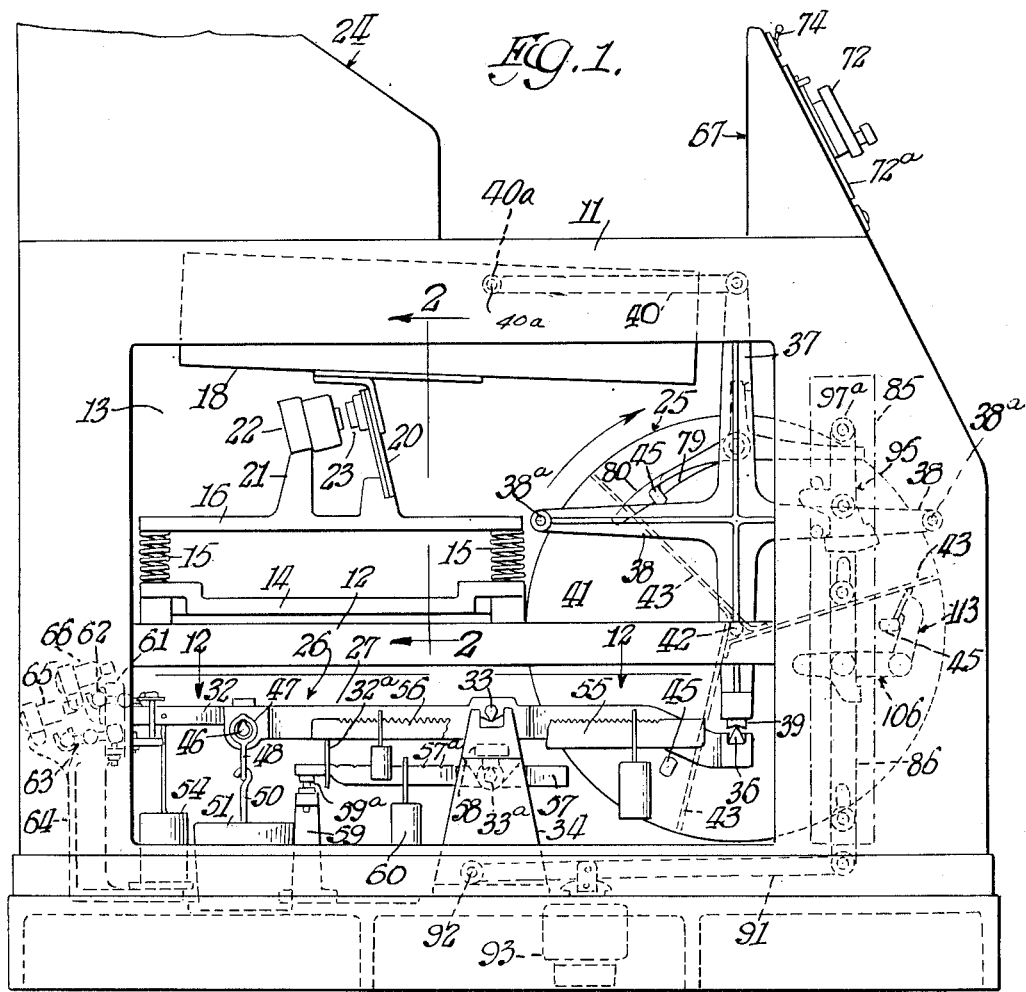
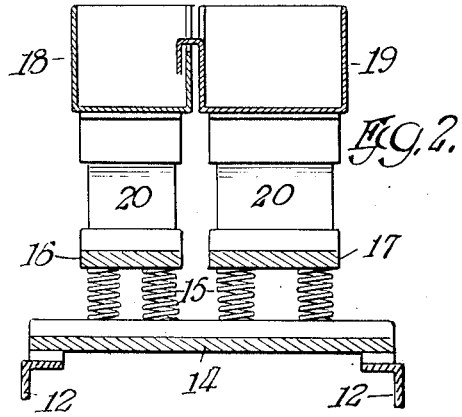
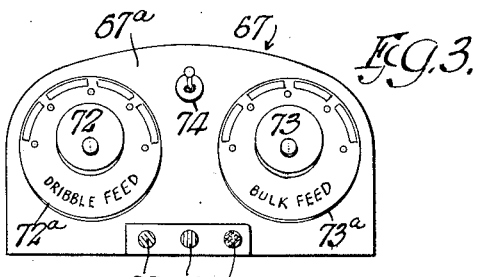
Inventor
Louis R. Muskat

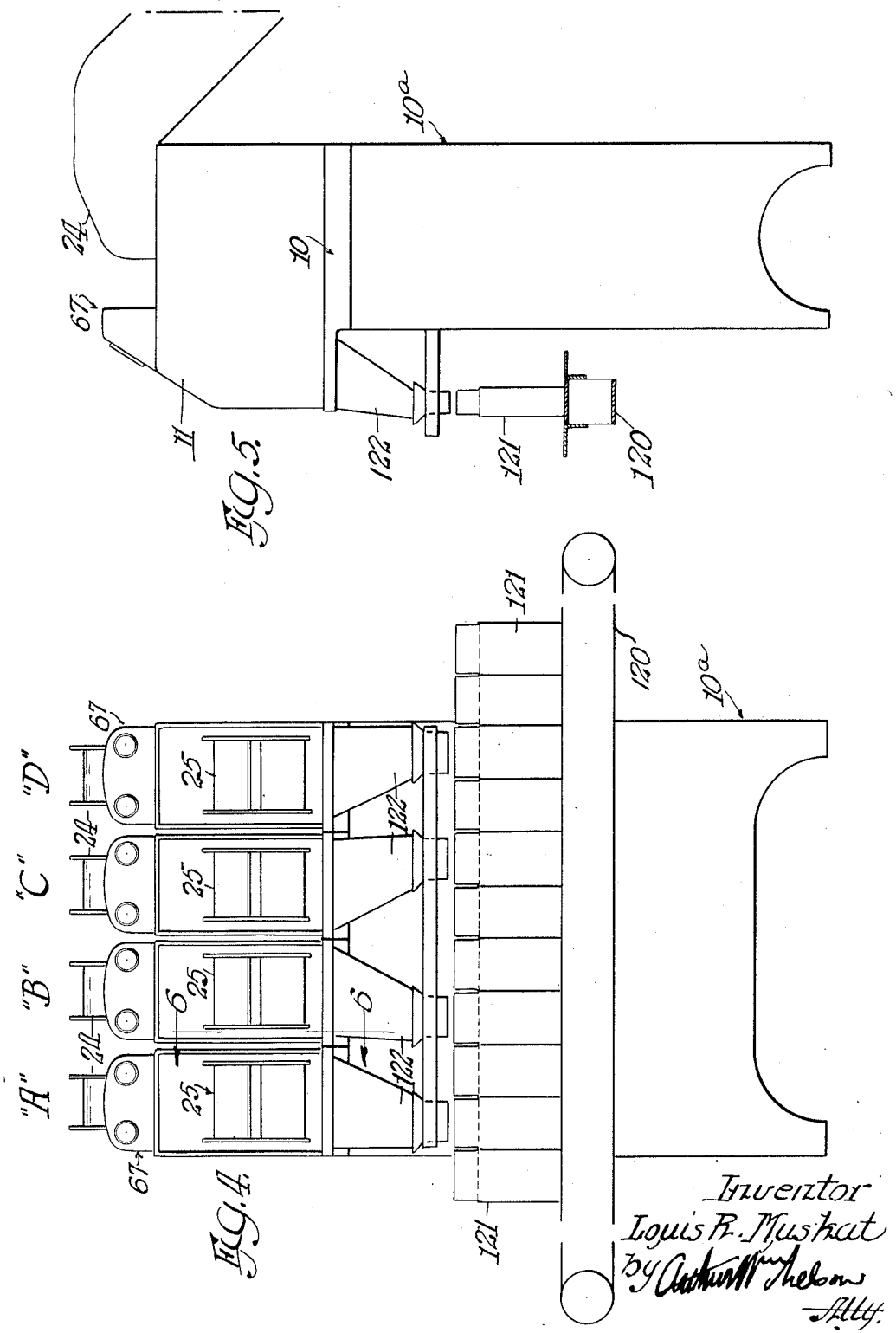

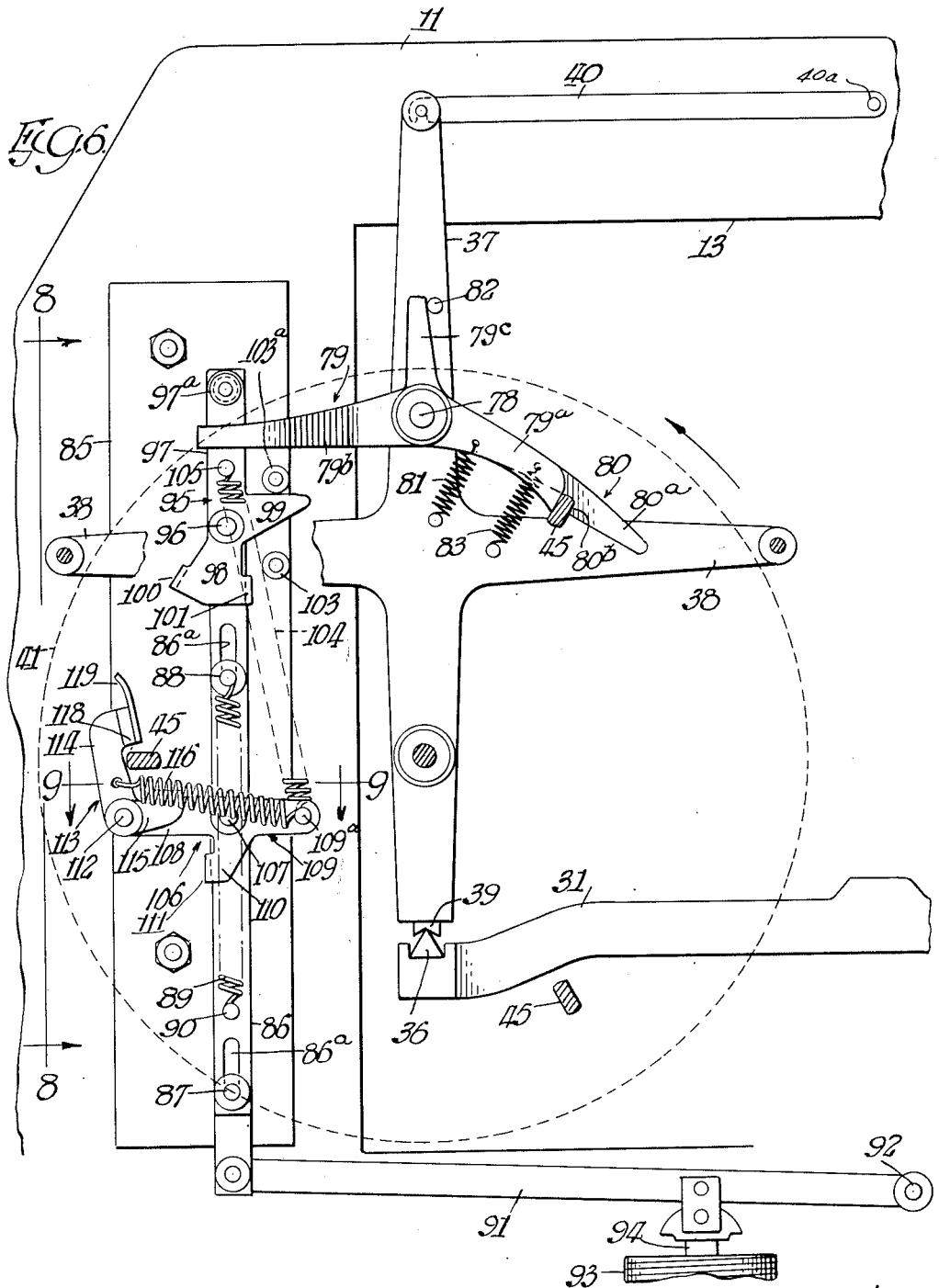

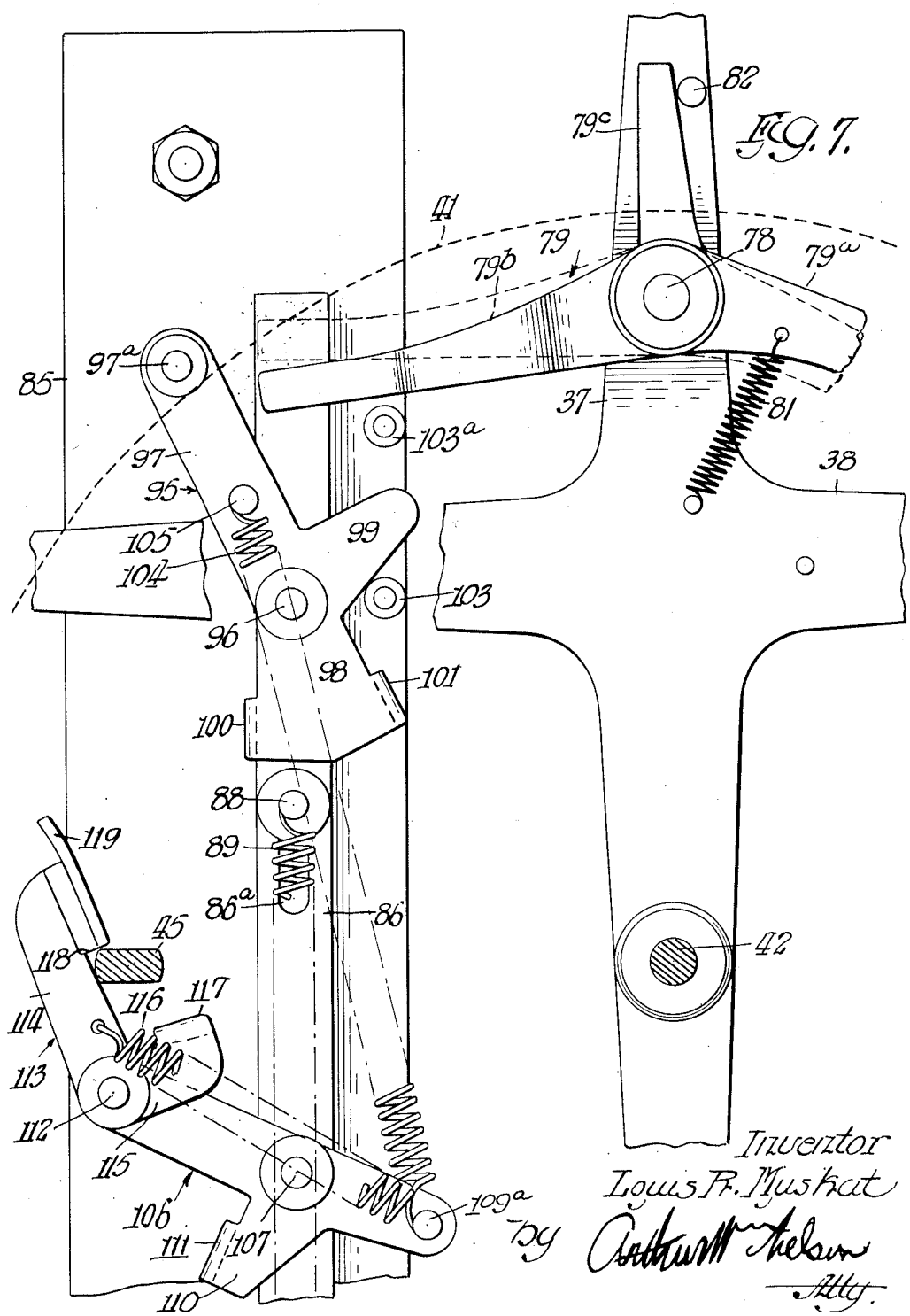

Oct. 14, 1952        L. R. MUSKAT        2,613,905
AUTOMATIC WEIGHING MACHINE
Filed Dec. 19, 1945        7 Sheets-Sheet 5
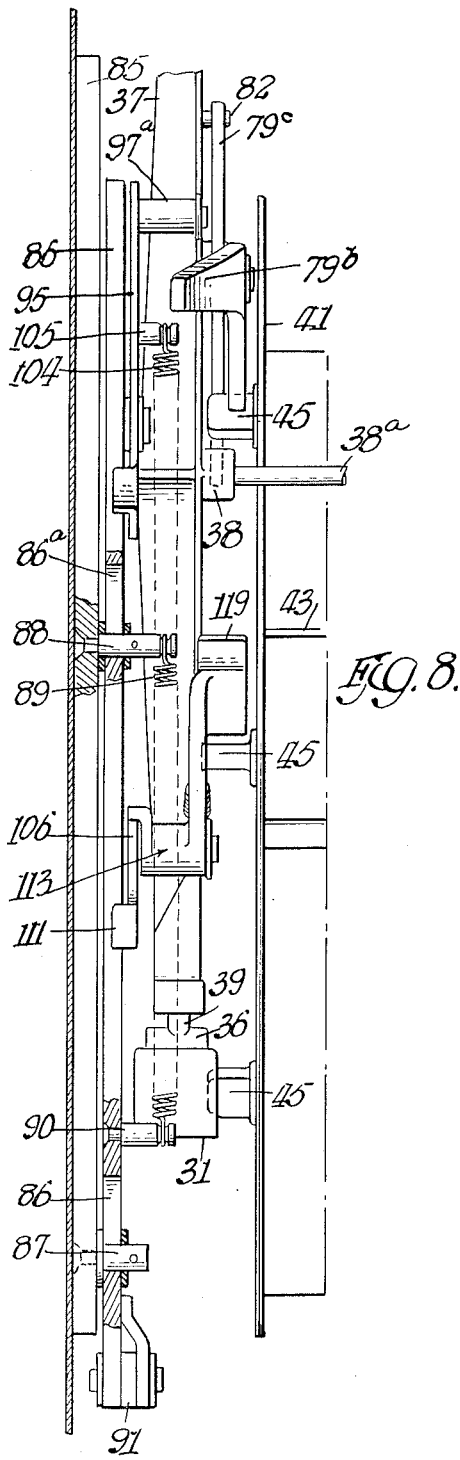
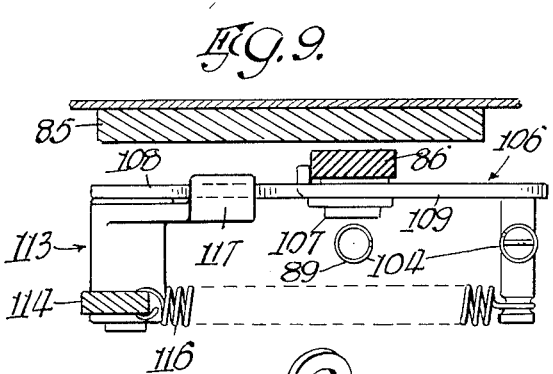
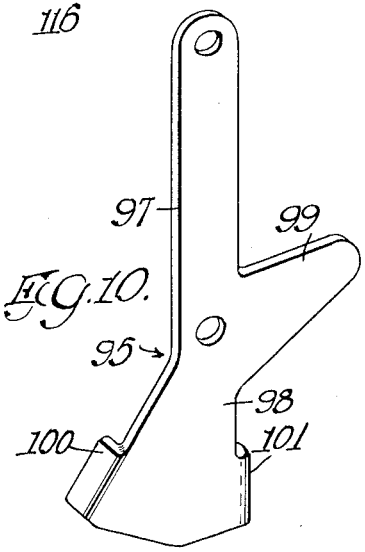
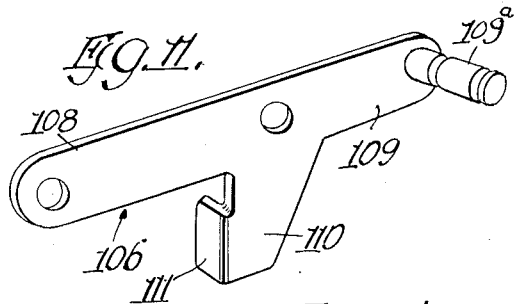
Inventor
Louis R. Muskat

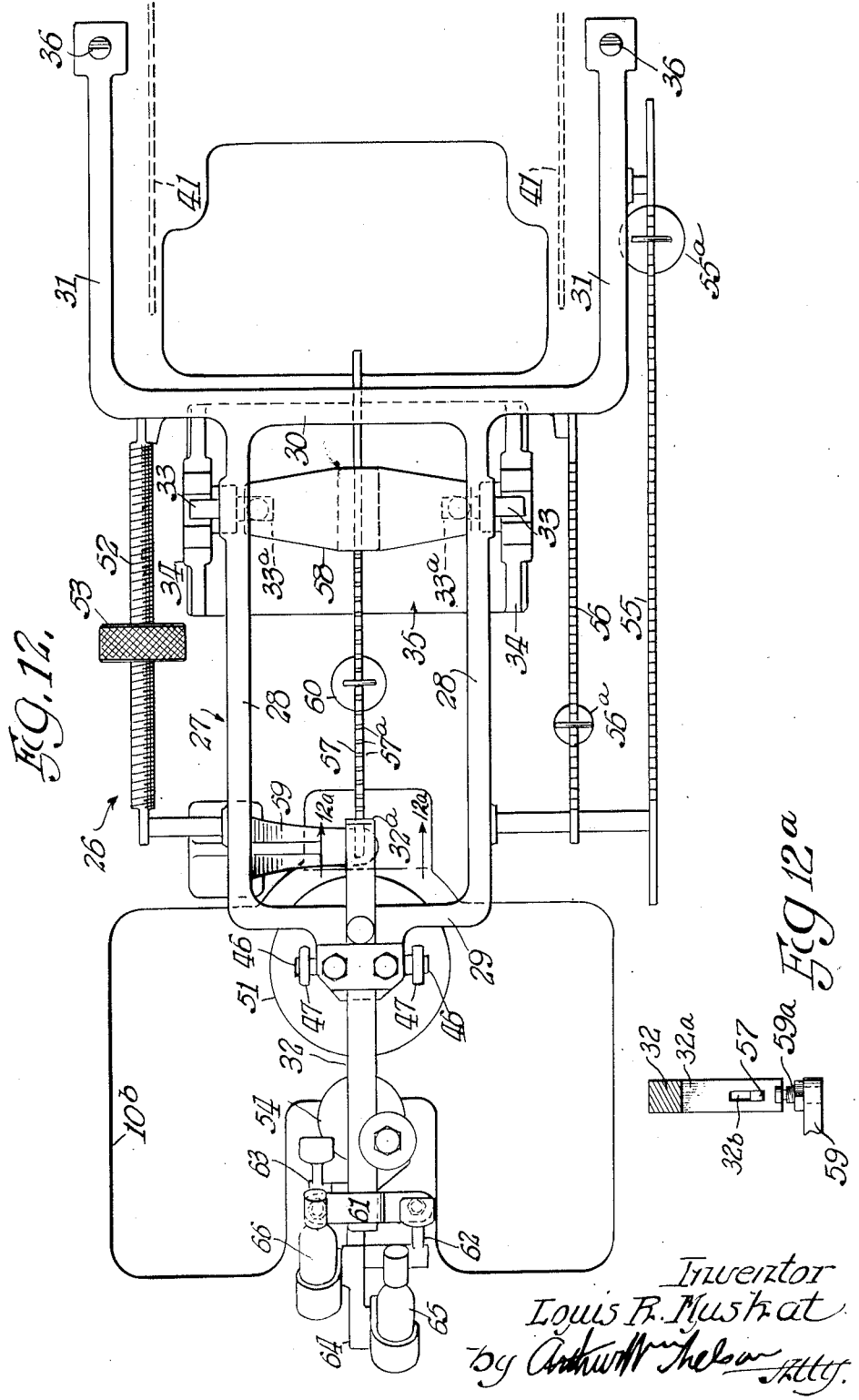

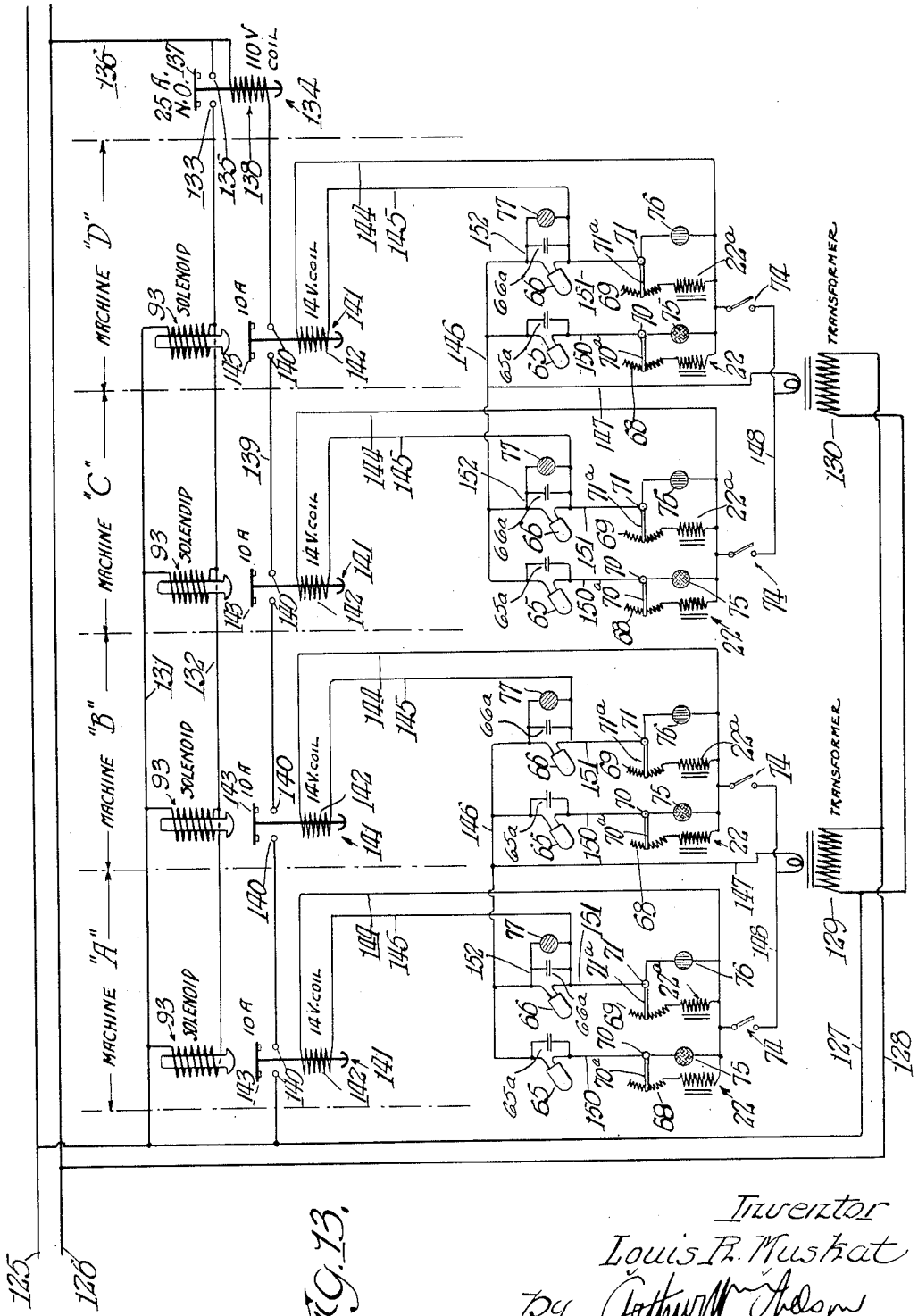

Patented Oct. 14, 1952

2,613,905

UNITED STATES PATENT OFFICE 2,613,905

AUTOMATIC WEIGHING MACHINE

Louis R. Muskat, Oak Park, Ill., assignor to Triangle Package Machinery Company, Chicago, Ill., a corporation of Illinois Application December 19, 1945, Serial No. 635,968

9 Claims. (Cl. 249—19)

This invention relates to improvements in automatic weighing machines and it consists of the matters hereinafter described and particularly pointed out in the appended claims. The invention is more especially concerned with machines of this kind that include a bucket having a commodity receiving compartment which moves from a filling position, wherein it receives a predetermined weighed amount of commodity, to a dumping position, wherein the weighed amount of commodity is discharged therefrom into a receptacle provided therefor, usually a carton or bag, or the like.

One of the objects of the present invention is to provide in an automatic weighing machine of this kind, power means rapidly to turn the bucket, and whereby greater weighing accuracy is possible, due to instant cutting off of the commodity stream and the moving of the filled compartment out of the range of said stream when full weight is reached.

Another object of the invention is to provide a machine of this kind wherein a bucket having a plurality of commodity receiving compartments is turned step by step at the same high speed, regardless of the weight amount of commodity desired to be fed to the compartment being filled, so that accuracy is obtained when weighing out different weight amounts with the machine.

A further object of the invention is to provide a machine of this kind, simple, efficient and positive bucket turning mechanism, making it possible to obtain accuracy in weighing out any weight amounts between almost the zero point of the capacity of the machine to the full capacity thereof.

Also, it is an object of the invention to provide means which, when a plurality of the improved automatic weighing machines is used in connection with an automatic packaging machine, causes a simultaneous dumping of the weighed out amounts of commodity from all of the machines, whereby a better coordination and synchronization between the weighing machines and the packaging machine is accorded, and greater speed, accuracy and uniformity in weighing is possible.

The above mentioned objects of the invention, as well as others, along with the advantages thereof, will more fully appear as the specification proceeds.

In the drawings:

Fig. 1 is a view in side elevation of an automatic weighing machine, of the step by step rotating bucket and vibratory tray type feed, embodying the preferred form of the invention.

Fig. 2 is a transverse vertical sectional view through the vibrating bulk and dribble commodity feeding means of the machine, as taken on the line 2—2 of Fig. 1.

Fig. 3 is a view in elevation of the manual control mechanism of the machine for controlling the speed of the feed of the bulk and the dribble commodity feeding means respectively, of the machine.

Fig. 4 is a view in front elevation, in schematic form, showing a plurality of the machines in a side by side relation as a "battery" for use in connection with a package container conveyor forming a part of an automatic packaging machine.

Fig. 5 is a view in side elevation of the machine appearing in Fig. 4 and more particularly shows the manner in whch the machnes are mounted on a common base.

Fig. 6 is a vertical detail sectional view, on an enlarged scale, as taken on the line 6—6 of Fig. 4, and more particularly shows the power mechanism for imparting the step by step rotary turning movement to the bucket of one of the machines, the parts being in the position they occupy when said mechanism is in its deenergized condition and in which the bucket is locked against turning during a filling operation of one of the compartments thereof.

Fig. 7 is a view showing parts of Fig. 6 in a position different from that of Fig. 6 and on a scale enlarged thereover and which will be described later.

Fig. 8 is a view in front elevation of the parts shown in and on the scale of Fig. 6, as viewed in the direction of the arrows 8—8 thereon.

Fig. 9 is a detail horizontal sectional view through parts shown in Fig. 6 as taken on the line 9—9 and on a scale enlarged over that of Fig. 6.

Figs. 10 and 11 respectively are detailed perspective views, on an enlarged scale, of parts appearing in Fig. 6 and which will be more fully described later.

Fig. 12 is a horizontal sectional view, as taken on the line 12—12 and on a scale greater than that of Fig. 1 and more particularly illustrates the scale beam and associated parts of the weighing mechanism of the machine.

Fig. 12a is a vertical detail sectional view through parts appearing in Fig. 12, as taken on the line 12a—12a thereof.

Fig. 13 is a view showing a circuit for a battery of machines as appears in Fig. 4 when used in connection with the conveyor of an automatic packaging machine and which will be more fully referred to later.

Referring now in detail to that embodiment of the invention illustrated in the drawings and especially to Fig. 1 thereof, the improved automatic weighing machine includes a horizontal base 10 that is usually supported at the desired elevation by means of a suitable stand. When a plurality of such machines is arranged side by side as a battery for use in connection with an automatic packaging machine, all of said machines may be mounted on a common stand 10a, as appears best in Figs. 4 and 5.

At each side of the base (of each unit) is an upright side frame 11 and to the inner face of each frame is fixed an angle bar 12 that spans a relatively large opening 13 therein. A platform 14 is supported at its sides upon the bars 12—12 and spaced thereabove and supported by shock and vibration absorbing springs 15 are laterally spaced platform plates 16 and 17 respectively, and which appear in Fig. 2. Above each platform plate is an open ended, substantially horizontal commodity feeding means in the form of trays 18 and 19 respectively. The trays are each supported for longitudinal vibration from its platform plate by a set of spring leaves 20 and spaced back of each set of spring leaves is an upwardly extending part 21 that supports electro-magnetic coils 22—22a (see Fig. 13). Associated with each coil is an armature 23 carried by the leaves 20. When the coils 22—22a are energized, they will, through the armatures 23—23, cause a longitudinal vibration of the trays.

The trays 18 and 19 are of different cross sectional areas and volumes and one tray constitutes the dribble feed tray for the machine, while the other tray constitutes the bulk feed tray therefor.

At the rear upper end of the side frames 11—11 of each machine is a conveyor means 24, which leads from a hopper for the commodity to be weighed and discharges said commodity into the bottom of the trays 18 and 19. In the vibration of the trays, the commodity discharged thereinto by said means 24 is fed forwardly to be discharged from the front end thereof as a relatively heavy bulk feed stream and a relatively fine or light dribble feed stream into one of the compartments of a step by step rotating bucket 25.

Located on the base 10 is the weighing mechanism of the machine indicated as a whole in Fig. 12 by the numeral 26, and which includes a substantially horizontally disposed, tiltably mounted open frame-like scale beam 27. As best appears in said Fig. 12, this beam includes laterally spaced side beam members 28—28 connected at the rear end by a bar 29 and at the front end by another bar 30. The ends of the bar 30 project laterally beyond the members 28 and are then turned forwardly as arms 31—31 that are spaced a greater distance apart than said members 28—28. 32 indicates the tail piece for the beam, which is so fixed in the midportion of the bar 29 as to extend rearwardly and forwardly therefrom.

The side members 28—28 of the beam are provided with outwardly extending aligned bearing blades 33—33 a short distance rearwardly of the bar 30 and these blades each engage in a bearing block in the upper ends of the uprights 34—34 of a bracket 35 that extends transversely of the base 10 and is suitably secured thereto. By means of the blades and bearing blocks mentioned, the beam 27 as a whole is capable of limited tilting or rocking movement.

The arms 31—31 constitute the supporting arms of the beam for the bucket 25 and each is provided in the upper face of its front end with a blade 36. Resting on each blade is a cruciform bail, each including an upright member 37 and forwardly and rearwardly extending horizontal members 38—38 respectively. The lower end of each member 37 carries a bearing element 39 for engagement upon an associated blade 36. The upper end of each upright member 37 has pivoted thereto the front end of a retaining link 40 (see Fig. 1), the other end of which is pivotally attached at 40a to an associated side frame 11 above the opening therein.

The bucket 25, which includes laterally spaced circular end plates 41—41 and a shaft 42, arranged axially of said plates, has end portions which extend beyond the same to be journalled in the uprights 37—37 of the bails before mentioned. Extending between said end plates is a plurality of partitions 43, which divide the bucket into compartments, each to receive the commodity discharged from the front end of the trays 18 and 19, when each compartment is in the upwardly facing or opening filling position. On one of the end plates 41 of the bucket and projecting outwardly therefrom is a plurality of arcuately spaced studs 45—45, one for each compartment in the bucket, the purposes of which will appear later. The ends of the members 38—38 of the bails are connected together outside of the periphery of the plates 41 by tie rods 38a (see Fig. 1).

By means of the parts above described, the bails are held in such a manner as to ride upwardly and downwardly in the tilting of the beam 27, without a displacement from their supporting position for the bucket 25 and which movement is quite small and in practice amounts to about only ⅛ of an inch.

It is obvious that the part of the beam 27 rearwardly of its pivot blades 33 must balance that part of the beam forwardly of said blades, plus the weight of the parts supported by the arms 31—31. In the present instance there is provided a non-adjustable approximate balance means and an adjustable balance means therefor, now to be described.

A rear extension of the bar 29 of the beam is provided with laterally extending blades 46 to receive the bearing eyes 47 of a U-shaped hanger 48. Engaged with said hanger is the hook of a stem 50 that supports the main and non-adjustable balance weight 51, there being an opening 10b (see Fig. 12) in the base, to accommodate the movement of this weight in the tilting or rocking of the beam. The weight 51 is made up of a metal container for holding a suitable amount of lead, which is poured into said container in a molten condition. It is obvious that it is difficult to provide a weight 51 which, in itself, would accurately balance the beam and the parts carried thereby. The adjustable weight for the beam is, therefore, necessary to accurately balance the beam and one form thereof is of follows:

52 indicates a threaded shaft (see Fig. 12) extending longitudinally and spaced laterally from one of the members 28 of the beam and suitably supported at its ends from parts of the beam. On this shaft is threaded a nut-like weight 53. By turning the nut in one direction or the other, it may be caused to travel longitudinally of the shaft 52 into a position cooperating with the weight 51 in balancing the beam 27. To prevent a too rapid tilting movement of the beam in either direction, the tail piece 32 thereof is operatively connected to a suitable dash pot mechanism, indicated as a whole at 54 in Fig. 1.

To meet the weighing characteristics of different commodities in weighing out predetermined weight amounts thereof, as for example in units of one pound each, I provide means whereby the amount of commodity by weight to be bulk fed and the amount of commodity to be dribble fed for each weighing operation, may be adjusted with the total weight of the bulk fed and the dribble fed commodity, making up the pound unit.

At that side of the beam 27, opposite the shaft 52, are located longitudinally extending, vertically edgewise disposed scale bars 55 and 56 respectively, each suitably supported by the parts 28 and 31 of the beam. Each bar is notched in its upper edge as in bars of this kind and associated therewith is a weight 55a and 56a respectively. By moving the weights into different positions along the bars, the amount of commodity to be bulk fed may be accurately determined.

57 indicates a third weighing bar which is disposed on the longitudinal median line of the beam. Its forward end is fixed in a transverse bridge 58 located between the upright standards 34—34 of the bracket 35. This bridge carries at each end a bearing block that engages upon a blade 33a that extends inwardly from an associated bracket standard 34, below the blade 33 thereon. By means of the parts mentioned, the bridge 58 and bar 57 may rock on the blades 33a.

The rear end of the bar 57 is reduced in vertical width and it there normally rests upon an adjustable stop 59a on a post 59 that rises from the base 10. In the top edge of the bar are notches 57a, any one of which will receive the bail of a weight 60 to hold the weight in a definite set position on the bar 57. The end part of reduced width of the bar extends through a lost motion slot 32b (see Fig. 12a) in yoke 32a depending from the front end of the tail piece 32. When the front end of the beam lowers under the weight of the bails and the bucket 25 and a commodity load, the rear end will rise and in the initial part of this rise is ineffective to move the rear end of the dribble feed weighing bar 57 because of the lost motion provided by the slot 32b before mentioned. In the final part of the rise of the rear end of the bar, the bottom end of the slot 32b engages the bottom edge of the end part of reduced width of bar 57 so that the yoke 32a picks up the rear end of the bar and rocks the same about a pivot afforded by the blades 33a, before mentioned.

The rear end of the tail piece 32 carries a clip 61, disposed in operative relation with respect to a pair of magnet carrying arms 62 and 63 respectively, pivoted on an upright 64 rising from the base 10. Carried by said base, above the arms mentioned, are the mercury containing vessels 65 and 66 of a pair of switches that control the "on" and "off" periods of the coils 22 and 22a respectively for the feed trays 18 and 19 respectively. In the tilting movement of the beam 27 under a commodity load, the rear end tail piece 32 in its upward swing or rise, will first open the switch (arm 62 and vessel 65) for the bulk feed tray which then stops, and in the final part of the upward swing will open the switch (arm 63 and vessel 66) for the dribble feed tray, which then stops. When the commodity load, which has caused the tilting of the beam in one direction, has been dumped, the beam tilts in the other direction so that the switches mentioned again cause a vibration and feeding movement of the trays 18 and 19.

On the upper front ends of the side frames 11—11 there is supported a housing 67 that contains a pair of rheostats 68 and 69 (see Fig. 13) respectively associated with the coils 22 and 22a respectively. Each rheostat includes a shaft 70 and 71 respectively, each of which carries an arm 70a and 71a respectively (see Fig. 13) for wiping engagement with the coils of the rheostats. These shafts extend through the front plates 67a of the housing and fixed to each of these extending parts of the shafts are knobs 72 and 73 respectively (see Fig. 3). Associated with each knob is an indicator dial 72a and 73a. By means of these knobs, through the rheostats mentioned, the amplitude of the movement of the trays 18 and 19, but not the frequency, may be adjusted.

Also, on the front plate is the main switch 74 for the machine. By means of this switch the machine may be manually started and stopped. On said plate, below the dials, are indicators 75—76 and 77, which may be in the form of amber, red and green lights respectively. The "amber" light 75 is associated with the bulk feed tray of the machine, and the "red" light 76 is associated with the dribble feed of the machine, to visibly indicate to the operator which feed is in operation. The "green" light 77 indicates when full weight of commodity has been fed by the trays 18 and 19 to the bucket compartment in filling position. This "green" light is "out" when either the "red" or "amber" light is "on."

It is, of course, desirable to hold the bucket 25 against turning movement in the feeding of the predetermined weight amount of commodity into a bucket compartment and to thereafter release the same for a turning movement of the bucket into a dumping position for the filled compartment and then to stop and hold the bucket in the filling position for the next compartment. Means is provided for this purpose and is constructed as follows:

Pivotally mounted on one of the uprights 37 of one of the bails, as at 78 (see Fig. 6) is a trippable stop trigger 79 and a rebound preventing trigger 80 respectively. The trigger 79 includes a rearwardly and downwardly curved arm 79a, a forwardly extending arm 79b and an upwardly extending arm 79c which appears best in Fig. 6. A spring 81 connects the arm 79a with the associated bail and tends to swing the trigger clockwise, when viewed as in Fig. 6, until the arm 79c is stopped by a pin 82 in its normal position, and which pin is carried by the arm 37 of one of the bails, before mentioned. In this position of the trigger 79, the free end of the arm 79a is positioned in the arcuate path of movement of studs 45 in the step by step turning movement of the bucket and the arm 79b extends forwardly in substantially a horizontal position. When the arm 79b is depressed, or swung downwardly against the action of the spring 81, the other arm 79a swings upwardly out of the way of the stud 45 engaged therewith. This unlocks or releases the bucket 25 for one step in its turning movement under the action of a power means, later described.

The rebound preventing trigger 80 includes a downwardly and rearwardly extending arm 80a, which is longer than the arm 79a and its free end is so normally disposed that in a step of the turning movement of the bucket 25, one of the studs 45 thereof will so engage the free end of the arm as to swing it upwardly to pass thereunder to engage at one side with the end of the arm 79a. A spring 83 (see Fig. 6) is so connected to said arm as to return it to normal position and wherein a shoulder 80b thereon is arranged to engage the other side of the stud 45 and prevent a rebound or retrograde movement of the stud, after it has engaged the end of the arm 79a.

One form of power means for causing movement of the bucket for dumping purposes is best illustrated in Figs. 6, 7 and 8. On the inner face of the frame 11, associated with that bail that carries the triggers 79 and 80, and spaced forwardly therefrom, is an upright flat stationary relatively wide assembly and supporting bar 85. A narrower upright bar 86 is mounted on the face of the bar 85 and has a plurality of longitudinally extending slots 86a through which pins 87 and 88 (in Fig. 6) extend for threading into the bar 85 and whereby the bar 86 has a limited longitudinal movement on the bar 85. A spring 89, which is fixed at its upper end to the pin 88 and which is fixed at its lower end to a pin 90 on the bar, urges the bar 86 to move upwardly until limited by the engagement of the lower ends of the slots 86a with the pins 87 and 88 respectively.

The bottom end of the bar 86 has pivoted thereto one end of an actuating lever 91, the other end of which is pivoted as at 92, as shown in Fig. 6. Below this lever, between its ends, is suitably supported a solenoid or electromagnet 93, the armature 94 of which is operatively connected to the lever 91. When this electromagnet is energized, its armature 94 imparts a downward swing to the lever 91, which in turn will pull the bar 86 downwardly against the action of the spring 89 until limited by the engagement of the top end of the slots 86a with the pins 87 and 88 respectively. When said electromagnet is de-energized, the spring 89 returns the bar to its normal position, before mentioned.

95 indicates a trip or release member for the trigger 79, which is pivoted at 96 to the bar 86. This member, as best shown in Fig. 10, includes an upper arm 97, a lower arm 98 and a lateral arm 99. This member is preferably made as a stamping and the lower arm 98 thereof is formed with a pair of flange-like shoulders 100 and 101 respectively. When the member 95 is pivoted to the bar 86, as before mentioned, the shoulders 100—101 are disposed at opposite side edges of the bar 86 and limit the rocking movement of the member between the positions shown in Figs. 6 and 7. When the shoulder 101 engages its associated edge of the bar 86, the arm 97 is disposed in parallel alignment with the bar 86, as in Fig. 6, and when the shoulder 100 engages its associated edge of the bar 86, the arm 97 is inclined forwardly of the bar, as in Fig. 7. The top end of the arm 97 carries a roller 97a, which normally is disposed above and overhangs the trigger arm 79b.

When the bar 86 is moved downwardly, by means of the electromagnet 93 and lever 91, the roller 97a in the initial part of the movement of the bar 86, engages the trigger arm 79b from above and depresses the same to trip the arm 79a from its stop forming engagement by the stud 45 on the bucket. In the final downward part of the movement of the bar 86, the bottom edge of the lateral arm 99 engages a stop 103 on the bar 85 and causes the trip member 95 to swing counterclockwise about the pivot 96 in Figs. 6 and 7 into the position shown in Fig. 7 and in which it is stopped by the engagement of the shoulder 100 with its associated edge of the bar 86. In this swinging movement of the member 95, which occurs after the roller 97a has tripped the trigger 79, said roller rides laterally off the top edge of the trigger arm 79b so that the trigger 79 returns to normal position. It is pointed out at this time that a spring 104, which is attached at one end to a pin 105 on the arm 97, assists in this swinging movement of the trip member, and which swings through the plane of the pivot 96 as an overcenter yielding lock. The manner of attaching the other end of the spring 104 to an associated part will be mentioned later.

In the upward movement of the bar 86, which occurs instantly after its downward movement, the upper edge of the arm 99 of the trip member 95 will engage another stop 103a spaced above the stop 103 and also fixed to the bar 85. When this occurs the trip member 95 is swung clockwise until stopped by the engagement of the shoulder 101 with its associated edge of the bar 86. In this movement of the bar and the trip member, the roller 97a passes the end of the arm 79b and then swings inwardly to the position shown in Fig. 6. Thus the path of movement taken by the roller consists first of a straight downward movement, then outwardly in an arc, then straight upwardly, and then inwardly as an arc. Thus this roller, in its movements, depresses the arm 79b, swings off laterally therefrom, and returns in a straight upward movement to pass the end of the arm and then swings back into its position overhanging said arm.

106 indicates a lever having a normally horizontal position crossing the bar 86 and pivoted to one face of the bar by means of a pin 107 so that the arms 108 and 109 respectively thereof extend forwardly and rearwardly of the bar. The other end of the spring 104, before mentioned, is connected to a pin 109a carried by the arm 109. The midportion of this lever includes a depending and relatively short arm 110 formed with a flange 111 for engagement with the same side edge of the bar 86 as is engaged by the shoulder 100 of the trip member 95. By means of the spring 104, the lever 106 is normally held in the position shown in Fig. 6 and wherein the shoulder 111 is engaged with the edge of the bar 86.

Pivoted at 112 on the arm 108 is a bell crank shaped latch piece 113, which includes the arms 114 and 115 respectively. A spring 116 is fixed at one end to the arm 114 and at the other end to the pin 109a and tends to swing the latch piece clockwise until stopped by the engagement of a shoulder 117 on the arm 115 with the top edge of the arm 108 of the member 106. The arm 114 carries a hook 118 for engagement with the studs 45 on the bucket and this hook includes trip flange 119 which is normally disposed in a position to be engaged by the studs 45 in the step by step turning of the bucket.

In the downward movement of the bar 86 the pivot point 107 of the lever 106 will move downwardly therewith. However, as the hook 118 still hangs on to the associated stud 45, the lever 106 is caused to swing about the pivot point 112 into the position shown in Fig. 7 stretching the spring 104 and storing energy therein. This action, of course, occurs before the trigger 79 has released its associated stud 45.

At this time, the spring 104 is under tension and is energized but the bucket is still held against turning by the trigger 79. As soon as the trigger is actuated (by the roller 97a) the stored up energy in the spring 104 tends to swing the lever 106 counterclockwise about its pivot 107 with the bar 86, so that the latch piece gives a forceful impetus to the associated stud 45 to impart a quick snap action step of movement to the bucket to discharge the filled compartment and bring another compartment into filling position.

In this snap action step of movement of the bucket, the stud 45 released by the trigger 79, swings toward the latch piece which is at this time in the position shown in Fig. 6. As said stud approaches said latch piece, it will first engage the flange 119 of the latch piece and swing it out of its path of movement, against the action of the spring, 116, so as to enter into position beneath the hook 118 ready for the next operation.

It is to be noted that the turning action of the bucket in its step by step movement does not depend upon the gravitational effect of the commodity for a turning of the bucket, but is produced with a quick snap action by reason of the power means as afforded by the energized spring 104. Thus in the turning of the bucket step by step, a quick cut-off is produced upon any such commodity as may be in suspension between the delivery end of the trays 18 and 19 and the compartment of the bucket just filled prior to a turning of the bucket to a dumping position for that compartment. Thus, speed of operation and accuracy in weighing is afforded by a mechanism such as above described.

In Fig. 4 there is illustrated a group of four automatic weighing machines indicated at "A," "B," "C" and "D" respectively, arranged side by side as a battery for use in connection with an endless belt 120. This belt forms a part of an automatic packaging machine and conveys a plurality of cartons 121, into and out of filling position with respect to the filling spouts 122 of each machine A, B, C, and D respectively. Each spout is so arranged in its associated machine as to receive from the bucket, a weighed out amount of commodity and to direct the same into the carton lined up beneath said spout.

While four machines are illustrated as composing the battery mentioned, it is obvious that the machines may be less or even more in number. However, whatever the number of machines that may compose the battery, it is desired that they all discharge their weighed out amounts of commodity simultaneously because in this way it is possible accurately to synchronize the operation of the weighing machine with the operation of the packaging machine.

In Fig. 13 is illustrated a circuit for the battery of automatic weighing machines A, B, C and D and whereby even though one of the machines might be ahead of or behind the others in completing the weighing of the predetermined weighed out amount of commodity, its bucket will remain passive with its feeding trays 18 and 19 stopped, until the last machine in the group has weighed its predetermined weighed out amount of commodity for a simultaneous operation of the buckets thereof to turn them from the now filled position to the dumping position.

In Fig. 13, 125 and 126 indicate the feed lines for electrical energy from a source of supply and leading therefrom are the lines 127—128 for the transformers 129 and 130 respectively, each of which serves two machines, as shown in the circuit.

The solenoids 93 of said machines are connected by the lines 131 and 132 from the line 127 to one of the contacts 133 of a relay 134 and the other contact 135 thereof is connected by a line 136 to the line 126. This relay includes an armature 137 for bridging the contacts 133—135, the armature being associated with the coil 138 of the solenoid. This solenoid constitutes the main control for the solenoids 93 of all of the machines and is normally open. When the armature 137 bridges the contacts 133—135, it connects the solenoids in circuit with the lines 125—126 so that said solenoids 93 are jointly energized to simultaneously energize the spring 116 for each machine and trip or release each bucket 25 for a simultaneous step of turning movement of said buckets from the filling position to the dumping position thereof, as before described.

The coil 138 of the relay 134 has one side connected to the line 136 and its other side is connected by a line 139 with the line 127. In said line 139, one set of spaced contacts 140—140 is provided for each machine. Each set of contacts is incorporated in a relay 141 that includes a coil 142 and an armature 143, the latter being arranged to bridge the associated set of contacts 140 to close its part of the line 139. It is to be noted that before the line 139 is closed to coil 138, each armature 143 must bridge its set of contacts 140, the sequence of such bridging being of no moment.

Each coil 142 has the lines 144 and 145 connected thereto, the line 144 being connected to vibrator coils 22—22a respectively of each machine and to the rheostat 68 thereof. The mercury vessels 65 and 66 of each machine are arranged in circuit as follows: One side of each vessel 65—66 of each two machines is connected to a line 146 that is connected by a line 147 to the associated transformer 129—130 respectively. A line 148 connects each transformer with the line 147 of the associated pair of machines and in said lines are the manually operable switches 74 whereby the machine may be stopped when necessary. The other side of each vessel 65—66 is connected by the lines 150—151 respectively with the line 144 of the same set and employed with each vessel, to prevent arcing therein, is a condenser 65x and 66x arranged in parallel with the associated "green" light 77. In said lines are included the rheostat arms 70a—71a for each pair of machines, as well as the indicator lights 75 and 76 thereof for the bulk and the dribble feed for each machine of the pair. The line 145 for each pair of machines is connected to the lines 151 thereof and the indicator light 77 is connected in this line and to the line 146 by a line 152.

With the circuit described, the relay 141 associated with each coil 142 is energized so long as the associated switch vessel 66 is closed. As soon as said vessel is opened by the tilting action of the scale, the only current flowing through each coil will be the quite weak current flowing through the "green" light 77 and the condenser 66x in parallel therewith. However, this current is not sufficient to hold the plunger of any relay 141 in the energized condition with the result that said plunger drops and the bridge 143 thereof engages the associated contacts 140 in the line 139. Thus, as each machine makes its weight its relay 141 functions to close its part of the line 139 to the master control relay 134. When the scales of all of the machines have made or received full weight, all pairs of contacts 140 will be connected by the bridges 143 so that the entire line 139 is now closed. Therefore, current flows through the coil 138 of the master relay 34 so that its bridge 137 will operatively connect the contacts 133 and 135 and current will flow through the solenoids 93 of all machines A, B, C, and D, to cause a simultaneous movement of the buckets 25 thereof for a discharge of the weighed out contents therefrom.

In the operation of the battery of the machines A, B, C, and D, appearing in Fig. 4, assume that said machines have just simultaneously dumped their commodity loads into their associated spouts 122 and which direct said loads into the cartons 121 therebeneath and disposed upon the belt 120. At this time the bucket 25 of each machine is locked in its stopped position with one of its compartments facing upwardly, read to receive a weighed out commodity load from its associated set of trays 18 and 19 in the next cycle of operation of said machines.

With the bucket 25 of each machine relieved of its commodity load, the beam 27 of each machine will tilt counterclockwise as viewed in Fig. 1. In the tilting movement of each beam, the tail piece 32 thereof will cause the arms 62—63 on the upright 64 to actuate the associated vessels 65 and 66 to energize the coils 22 and 22a of the associated machine, to produce a vibratory motion for the trays 18 and 19 to again bulk and dribble feed the commodity to the bucket of each of said machines. When the trays of said machines are in operation, the "amber" and the "red" lights 75 and 76 of each machine are "on" and visibly indicate to the operator that said trays are in operation. When the proper amount of commodity has been bulk fed to the buckets of the machines, the "amber" light of each machine goes "out" while the "red" light stays "on" to indicate that the dribble "feed" for each machine is still in operation. When the proper amount of commodity has been dribble fed to each bucket, the "red" light thereof goes "out" and the "green" light of each machine then comes "on" to indicate that a full weight commodity load has been discharged into each bucket. Each bucket which has now descended in the tilting of the associated scale beam, is still locked against turning movement toward dumping position, by reason of the engagement of one of the studs 45 being engaged with the end of the trigger arm 79a and with the shoulder 80b of the trigger 80 respectively.

As the upwardly facing compartment in the bucket of each machine receives its weighed out commodity load, it will cause the associated beam to tilt clockwise so that the coil 142 of each relay 141 is deenergized by the opening of the circuit at vessel 66 to cause the armature 143 associated with each relay to drop and engage the associated sets of contacts 140 in the line 139.

Should one of the machines be ahead of the other in its weighing operation, it will function to cause its associated relay 141 and armature 143 to bridge the associated contacts 140 in the line 139. However, the relays 141 of the other machines are still energized and remain in this condition until a full weight commodity load has been fed to the buckets of each of said other machine. As each of said buckets receives its load the relay 141 associated therewith causes a closure of its part of the line 139.

Assume now in the operation of a battery of the machines A, B, C and D, that the bucket in each of machines A, B, C and D has received its load but that machine C has lagged or is a bit slower than the other in its feeding operation. Under such conditions, the relays 141 and associated bridges 143 of machines A, B, and D, will have closed the associated parts of the line 139. When the relay 141 associated with machine C is deenergized and drops by reason of the tilting of its scale beam 27, under the action of the commodity load delivered to the bucket thereof, its bridge piece 143 functions to close the gap between the associated contacts 140. This closes the line 139 of the circuit so that the coil 138 becomes energized to attract its armature 137 to bridge the contacts 133—135. This brings all of the solenoids 93 of said machines A, B, C and D into the circuit so that said solenoids become energized simultaneously. Thus each solenoid 93, through the lever 91 connected thereto, exerts a downward pull on the associated bar 86 and produces a quick snap action step of rotative movement of the associated basket as before mentioned to turn all of them simultaneously to dumping position.

Thus, even though the bucket of one machine of the battery A, B, C and D thereof may receive its commodity load before or after the buckets of the other machines may have received their commodity loads, they are all dumped simultaneously, after which the sets of feeding trays 18 and 19 of each machine automatically start to function to carry out another cycle of weighing operation.

By means of the structure described, greater speed of operation and more accurate weighing of the commodity is afforded and a better coordination is possible between the operation of a battery of automatic weighing machines with an automatic packaging machine.

While in describing the invention I have referred in detail to the form, arrangement and construction of the parts thereof, the same is to be considered only in the illustrative sense so that I do not wish to be limited thereto, except as may be specifically set forth in the appended claims.

I claim as my invention:

1. In an automatic weighing machine, the combination of a bucket having end plates and a material receiving compartment, a scale upon which said bucket is mounted for a turning movement from a filling position to a dumping position for said compartment, a trippable member adjacent an end plate of the bucket normally engaged with a fixed part thereon for releasably holding the bucket against turning movement when said compartment is in filling position, mechanism adjacent said end plate and including a spring having a contracted unloaded condition, during a filling of said compartment and a latch with which said spring is engaged, said latch being releasably engaged with another fixed part on said end plate of the bucket, said mechanism further including an actuator arranged parallel with said end plate and upon which said latch is pivotally mounted, said actuator being controlled by said scale and operative when weight has been made in said compartment to expand said spring to tension and power load the same and then actuate said trippable member to release said bucket and permits said power loaded spring to contract and function through said latch to turn the bucket with a snap action from said filling position for said compartment to said dumping position therefor.

2. In a stop and trip mechanism for the step by step turnable bucket of an automatic weighing machine, the combination of means for releasable engagement with a part of said bucket for holding the same against turning, a bar arranged for longitudinal guided reciprocatory movement upon a fixed support, a trip member on said bar operable in the movement thereof in one direction for actuating said means to release the bucket for a turning thereof, a spring secured at one end to said support and at its other end to said bar and having a contracted condition when said bucket is held against turning, means carried by said bar for movement therewith and including a member pivoted to said bar and a latch pivoted on said member and adapted for operative engagement with another part of the bucket, a second spring, one end of which is attached to said latch, the other end of said second spring being connected to said member pivoted on said bar and which second spring, in the movement of the bar in one direction, is expanded to be power loaded so that when said trip member releases the first mentioned means, said second spring contracts and operates through said member pivoted on said bar and through said latch to impart a snap action turning to said bucket.

3. In a stop and trip mechanism for the step by step turnable bucket of an automatic weighing machine, the combination of means for releasable engagement with a part of said bucket for holding the same against turning, a bar arranged for longitudinal guided reciprocatory movement upon a fixed support, a trip member pivoted on said bar and including a part operable in the movement of said bar in one direction for actuating said means to release the bucket for a turning movement thereof and then move into a position to permit said means to return to its original position, a spring having a contracted condition when said bucket is held against turning, and operatively connected at one end to said support and at its other end to said bar, means carried by said bar for movement therewith and including a member pivoted on said bar, and a latch pivoted on said member and adapted for engagement with another part of the bucket, a second spring connected at one end to said latch, the other end of the second spring being connected to said member pivoted on said bar, said first mentioned spring in the movement of the bar in one direction being expanded and power loaded so that when said trip member releases the first mentioned means, said first mentioned spring contracts and operates through said member pivoted on said bar and through said latch and said second spring to impart a snap action turning to the bucket.

4. In mechanism of the kind described, a support, a bar mounted on said support for a limited longitudinal movement in two directions, means carried by said bar and including a pivotally mounted latch and a spring operatively attached to said latch and to a part of said means respectively, a trip member mounted on said bar for movement between untripped and tripped positions, coacting means on said trip member and on said support respectively and operative in the movement of said bar in said two directions to cause said trip member to move from said untripped to said tripped position and back to said untripped position, means operative to hold said latch against escape in the movement of said bar in one direction, said spring in the movement of said bar in said one direction, when said latch is held against escape by said last mentioned means, being energized to power load the same, and which spring then functions when said trip member is in tripped position to impart a snap action kick to said latch.

5. In mechanism of the kind described, a support, a bar mounted on said support for a limited longitudinal movement in two directions, means pivotally mounted on said bar and including a pivotally mounted latch and a spring operatively attached to said latch and to a part of said means respectively, a trip member pivotally mounted on said bar for a swinging movement between untripped and tripped positions, coacting means on said trip member and on said support respectively and operative in the movement of said bar in said two directions to cause said trip member to swing from said untripped to said tripped position and back to said untripped position, means operative to hold said latch against escape in the movement of said bar in one direction, said spring in the movement of said bar in said one direction when said latch is held against escape by said last mentioned means, being energized to power load the same and which spring then functions when said trip member is in tripped position to impart a snap action kick to said latch.

6. In mechanism of the kind described, a support, a bar mounted on said support for a limited longitudinal movement in two directions, means carried by said bar and including a pivotally mounted latch and a spring operatively attached to said latch and to a part of said means respectively, a trip member mounted on said bar for movement between untripped and tripped positions, and including a lateral extension, means on said support and engageable by said extension in the movement of said bar in said two directions for causing said trip member to move from said untripped to said tripped position and back to said untripped position, means operative to hold said latch against escape in the movement of said bar in one direction, said spring in the movement of said bar in said one direction, when said latch is held against escape by said last mentioned means, being energized to power load the same, and which spring then functions when said trip member is in tripped position to impart a snap action kick to said latch.

7. In mechanism of the kind described, a support, a bar mounted on said support for a limited longitudinal movement in two directions, a member extending transversely of and pivoted on said bar and having end arms extending beyond opposite sides of said bar, a latch pivotally mounted on one arm and a spring connecting said latch with the other of said arms, a trip member mounted on said bar for movement between untripped and tripped positions, coacting means on said trip member and said support respectively and operative in the movement of said bar in said two directions to cause said trip member to move from said untripped to said tripped position and back to said untripped position, means operative to hold said latch against escape in the movement of said bar in one direction, said spring in the movement of said bar in said one direction, when said latch is held against escape by said last mentioned means, being energized to power load the same and which spring functions when said trip member is in tripped position to impart a snap action kick to said latch.

8. In mechanism of the kind described, a support, a bar mounted on said support for a limited longitudinal movement in two directions, a member extending transversely of said bar and pivotally mounted thereon for a limited swinging movement and having arms extending beyond opposite sides of said bar, a latch pivotally mounted on one of said arms and a spring connecting said latch with the other of said arms, means operative to hold said latch against escape in the movement of said bar in one direction, a trip member pivotally mounted on said bar for movement between untripped and tripped positions, a second spring connecting said trip member and said other of said arms, coacting means on said trip member and said support respectively and operative in the movement of said bar in said two directions to cause said trip member to move from said untripped to said tripped position and back to said untripped position, said first mentioned spring in the movement of said bar in said one direction, when said latch is held against escape by said first mentioned means, being energized to power load the same and which first mentioned spring functions when said trip member is in tripped position to impart a snap action kick to said latch.

9. In mechanism of the kind described, a support, a bar mounted on said support, coacting means on said support and said bar respectively providing a limited longitudinal guided movement of said bar on said support in two directions, spring means connected to said support and said bar for moving said bar in one direction to one limit of its movement, means carried by said bar and including a pivotally mounted latch and a spring operatively attached to said latch and to a part of said means respectively, means operative to hold said latch against escape in the movement of said bar in one direction, a trip member mounted on said bar for movement between untripped and tripped positions, coacting means on said trip member and said support respectively and operative in the movement of said bar in said two directions to cause said trip member to move from said untripped to said tripped positions and back to said untripped position, said spring in the movement of the bar in said one direction against the action of said spring means, when said latch is held against escape by said second mentioned means, being energized to power load the same, and which said spring then functions when said trip member is in said tripped position to impart a snap action kick to said latch.

LOUIS R. MUSKAT.

REFERENCES CITED

The following references are of record in the file of this patent:

UNITED STATES PATENTS

| Number | Name | Date |
|---|---|---|
| 375,163 | Jameson | Dec. 20, 1887 |
| 756,514 | Maxwell | Apr. 5, 1904 |
| 1,087,252 | Muzzy | Feb. 17, 1914 |
| 2,076,640 | Howard et al. | Apr. 13, 1937 |
| 2,141,296 | Ferguson | Dec. 27, 1938 |
| 2,191,711 | Godat | Feb. 27, 1940 |
| 2,205,471 | Fagerholm | June 25, 1940 |
| 2,299,636 | Mansbendel | Oct. 20, 1942 |
| 2,427,190 | Bradley | Sept. 9, 1947 |

FOREIGN PATENTS

| Number | Country | Date |
|---|---|---|
| 431,581 | Great Britain | July 11, 1935 |